United States Patent Office 2,864,771
Patented Dec. 16, 1958

2,864,771

METHOD OF MAKING FLUORESCENT PARA-MAGNETIC PIGMENTS AND PRODUCT PRODUCED THEREBY

Joseph L. Switzer, Gates Mills, Robert C. Switzer, Shaker Heights, and Richard A. Ward, Cleveland Heights, Ohio, assignors to John D. Steele, Cleveland, Ohio No Drawing. Application November 27, 1957
Serial No. 699,205

22 Claims. (Cl. 252—301.3)

This invention relates to the art of pigmentation and, more particularly, to a new class of paramagnetic pigmented particles. A general characteristic of our new class of pigments and pigmented particles is that they are, for the most part, brilliantly fluorescent. This invention is a continuation-in-part of our copending application for Method of Making Fluorescent Paramagnetic Pigments, Serial No. 59,752, filed November 12, 1948, now U. S. Patent No. 2,831,816, which application is a continuation-in-part of our application for Paramagnetic Fluorescent Compound and Method of Preparation, Serial No. 470,834, filed December 31, 1942, which application is a continuation-in-part of our application for Pigments, Serial No. 259,412, filed March 2, 1939, the last two applications now abandoned.

In general, some of the primary requisites of a good paramagnetic fluorescent pigment are that it should be a fine, nearly impalpable powder; it should not lose its fluorescing properties; and it should be extremely stable. Such stability should exist, first, with respect to its light-modifying properties, second, to its insolubility in the carriers in which it may be dispersed, and, third, to its chemical stability and inertness to atmospheric gases and moisture vapor, actinic radiation. Good paramagnetic fluorescent pigments should also be "normal," that is, the pigment particles should not flock together or coagulate after suspension in the carrier. Further, the pigment should be relatively inexpensive; that is, the cost of a pigment should not make it more practical to use other pigments having less desirable or totally different characteristics; this last requirement is often controlling and is no less important because of its economic rather than physical aspect.

This invention depends, in essence, upon the discovery that the general class of pigments disclosed in our application, Serial No. 259,412, may be precipitated upon suitable paramagnetic substrata, and, when so precipitated are held thereon by a molecular attraction between the precipitate and the substrata, such that the precipitate will not slough or "crock off" to a deleterious degree during substantial periods of use. Such attraction between the precipitate and the substrata was wholly unexpected, since the structural formula of the pigmentary precipitate admits of no chemical combination or "laking" with the substrata and the resistance of the pigmentary precipitate to "crocking off" the non-pigmentary substrata demonstrates that the attraction is greater than would be obtained by mere mechanical entanglement.

It has been demonstrated and found, on examination of pigment-like particles produced according to this invention, that the precipitates (fluorescent salts) tend to form around the paramagnetic substrata and become more or less of an adhered covering therefor, whereas the prior art achieved no such orientation. Prior art calling for the precipitation of a seemingly similar compound (a bismuth salt) in the presence of clay carried no implication of the bond between a fluorescent salt and a paramagnetic substrate demonstrably achieved according to this invention; a paramagnetic substrate material substituted for clay in the prior art example did not precipitate with the bismuth salt but remained in solution or suspension; likewise, the experimental addition of clay in an example of the prior art which precipitated a fluorescent salt employed in this invention revealed that the salt did not adhere to the clay but the salt and clay were merely mixed together in the product of the experiment.

Heretofore, one of the few rules which would aid in predetermining whether a compound might be fluorescent or nonfluorescent was the rule that any paramagnetic material would not fluoresce. There is a definite need for fluorescent, paramagnetic impalpable powders, as disclosed in the U. S. patent to Robert C. Switzer, No. 2,267,999. Rather than producing such powders according to said Switzer patent by applying fluorescent lacquers to paramagnetic particles, or joining fluorescent crystals to said particles by dispersing said particles in a melt or solution of such crystals (such lacquer or crystals tending to "crock-off" and separate quickly in use), it is an object of this invention, therefore, to provide a pigment-like compound which is both fluorescent and paramagnetic in spite of the fact that such a compound violates the above-stated rule which is now obviously empirical but which had heretofore held without exception.

Other and further objects and advantages of this invention should be apparent from the following specification and claims.

In general, our pigment compounds comprise the inner metallic complex of a phenol having the formula

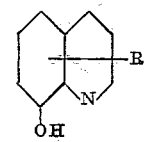

wherein R represents at least one of the groups consisting of hydrogen and substituents for hydrogen, said inner metallic complex being condensed on a solid, paramagnetic substratum in such a manner that a molecular attraction exists between the complex and the substratum. Although the substrata are usually more bulky than the complexes, there is usually no deleterious dilution of the light-modifying properties of the complexes when they are so condensed upon the substrata. Because of their more abnormal nature, our pigment compounds are usually more readily dispersed in most carriers, particularly, aqueous carriers. Still further, many complexes are further stabilized when condensed on the substrata. Because of the state of attraction between the complexes and the substrata, the complexes will not slough off the substrata to a deleterious degree during use which may include abrading contact between the particles during circulation of the medium in which the particles are suspended.

We may employ any one of several procedures to condense a complex on substratum, i. e., to set up the molecular attraction between the complex and the substratum. The specific procedures are, of course, determined by the complex and the substratum desired in the pigment compound and by the starting materials employed. For example:

(1) 8-hydroxyquinoline, or a derivative of it, and a metal salt, both in a concentrated state of solution, and an insoluble paramagnetic substratum suspended in a finely divided state in the solution are treated with an alkali or an alkaline-reacting material to react the 8-hydroxyquinoline with the metal salt to form an insoluble inner metallic complex and simultaneously precipitate the complex on the paramagnetic substratum; or, (II) 8-hydroxyquinoline, or a derivative of it, and a metal salt, both in a concentrated state of solution, the quantity of metal salt being in excess of the quantity required to react all of the 8-hydroxyquinoline, are treated with a quantity of an alkali or an alkaline-reacting material chemically equivalent to that of the metal salt, thus simultaneously precipitating the metal hydroxide and precipitating the inner metallic complex on the hydroxide; or, (III) 8-hydroxyquinoline, or a derivative of it, in a state of concentrated solution, is treated with an alkaline reacting metallic oxide in excess of the quantity required to react all of the 8-hydroxyquinoline to precipitate the inner complex of the metal of the oxide on the remaining unreacted metal oxide.

By way of illustration, and not by way of limitation, the following specific examples are given:

*Example 1.*—297 parts, by weight, of crystallized zinc nitrate are dissolved in 718 parts of ethyl alcohol and 290 parts of 8-hydroxyquinoline are dissolved in 718 parts of ethyl alcohol and the two solutions are mixed. 600 parts of red magnetic iron oxide, ground to an impalpable powder, are then added while rapidly stirring the mixture to maintain the iron oxide in suspension. Continuing stirring, 112 parts of potassium hydroxide, dissolved in a 50% aqueous solution of ethyl alcohol, are slowly added. As the potassium hydroxide is added, the inner zinc complex of the formula

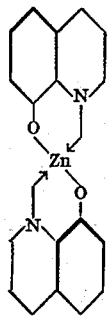

is precipitated. Because of the slight acidity of the complex and the slight basicity of the iron oxide, the complex precipitates on the iron oxide to form an insoluble pigment compound in which a molecular attraction exists between the complex and the substratum of iron oxide. The resultant potassium nitrate is dissolved in the aqueous alcoholic solution, which is decanted from the pigment compound. The pigment compound is then thoroughly washed to remove traces of potassium nitrate, ground, and dried.

The paramagnetic pigment compound thus produced is red-brown under white light and fluoresces a bright yellow-green under ultraviolet. The magnetic permeability of the pigment compound is not appreciably less than the magnetic permeability of the iron oxide. Thus, the zinc complex-iron oxide pigment compound is an excellent indicating medium when employed in the testing method disclosed in U. S. Patent No. 2,267,999, granted to Robert C. Switzer for Magnetic Testing. In this instance, the chromogenic properties of the comparatively transparent complex are altered to the point of being overpowered by the strongly colored opaque substratum of iron oxide. Since neither the fluorogenic properties of the complex (in spite of the fact that iron generally poisons fluorescigenous materials) nor the paramagnetic properties of substratum are deleteriously altered and since the product is useful because of its fluorescence and paramagnetism, the alteration of the chromogenic properties of the complex is quite immaterial when employed in the above identified process for magnetic testing.

*Example 2.*—The procedure of Example 1 is followed except that, instead of the magnetic red iron oxide, finely powdered stainless steel dust, preferably cold worked, is employed as the insoluble solid substrata upon which the zinc complex is precipitated. Since the stainless steel substratum is not strongly colored, the pigment is a whitish yellow under white light and, under ultraviolet, fluoresces a bright yellow-green several times brighter than the paragmentic pigment of Example 1.

Although stainless steel is not normally regarded as being a magnetic material and is seldom classified as such, it is measurably paramagnetic and, usually suspended in a fluid testing bath, may be employed as an indicating medium in the magnetic testing method disclosed in the above mentioned U. S. Patent No. 2,267,999.

*Example 3.*—Any one of the foregoing procedures may be employed, as the nature of the substrata may dictate, to produce paramagnetic pigments utilizing suitable paramagnetic metals, metal alloys, and metal oxides, hydroxides, or salts as the substrata. As a further example of a fluorescent paramagnetic pigment, Example 1 may be followed, except that, instead of the magnetic red iron oxide, powdered aluminum may be employed, and to reduce dissociation of the water in the 50% aqueous alcoholic solution of potassium hydroxide by the powdered metallic alumina, the potassium hydroxide is dissolved in technical anhydrous (95%) ethyl alcohol.

*Example 4.*—435 parts by weight of 8-hydroxyquinoline and 342 parts of aluminum sulfate are dissolved in sufficient aqueous solution of ethyl alcohol to form a concentrated solution. 600 parts of red magnetic iron oxide, ground to an impalpable powder, are then added while rapidly stirring the mixture to maintain the iron oxide in suspension. Continuing stirring, 168 parts of potassium hydroxide, dissolved in an aqueous solution of ethyl alcohol, are slowly added. As the potassium hydroxide is added, the inner aluminum complex of the formula

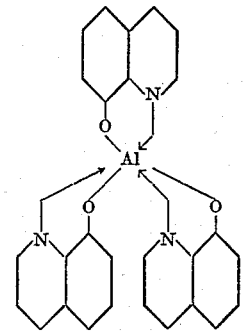

is precipitated. The resultant potassium sulfate is dissolved in the aqueous alcoholic solution, which is decanted from the pigment compound. The pigment compound is then thoroughly washed to remove traces of potassium nitrate, ground, and dried. The pigment compound thus produced is red-brown under white light and fluoresces a bright yellow-green under ultraviolet light.

*Example 5.*—183 parts, by weight, of zinc acetate are dissolved in 718 parts of ethyl alcohol and 290 parts of 8-hydroxyquinoline are dissolved in 718 parts of ethyl alcohol and the two solutions mixed. 600 parts of carbonyl iron (5 micron size), are then added while rapidly stirring the mixture to maintain the iron in suspension. Continuing stirring, 112 parts of potassium hydroxide, dissolved in a 50% aqueous solution of ethyl alcohol, are slowly added. As the potassium hydroxide is added, the inner zinc complex is precipitated on the iron. The resultant potassium acetate is dissolved in the aqueous alcoholic solution, which is filtered from the pigment compound. The pigment compound is then thoroughly washed and cleaned to remove traces of all materials other than the fluorescent paramagnetic pigment compound, ground and dried. The paramagnetic pigment compound thus produced is gray under white light and fluoresces a bright yellow-green under ultraviolet.

In the foregoing examples where the substrata are at least slightly basic, the fluorescence of the complexes is appreciably stabilized and prolonged. This is believed to result from the fact that acidic conditions apparently tend to permit the complexes to dissociate. Thus, by having the intimately associated substrata slightly basic, the substrata probably tend to neutralize any extraneous elements which would tend to dissociate the complex of the pigment compounds.

The metal zinc, in the foregoing examples, is illustrative of divalent metals and aluminum is illustrative of trivalent metals which produce strong light-modifying complexes with 8-hydroxyquinoline or derivatives of it. As pointed out in our above identified prior applications, other suitable metals are calcium, cadmium, beryllium, magnesium and the like. The 7-methyl and the 5,7 dichlor substituted phenols are examples of the substituted phenols of the general formula,

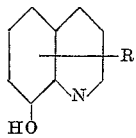

in which R represents hydrogen and substituents for hydrogen. As pointed out in our above identified prior applications, other substituted phenols may be of the 6 methyl, 5 methyl, 2 methyl, 5 amino, 5 benzeneazo, and like types.

From the foregoing, it should be apparent that the specific examples are given for the purpose of illustrating to those skilled in the art how the broad class of pigment compounds, which we have discovered, may be manufactured. This invention, therefore, is not limited to the embodiment disclosed but by the appended claims. It is to be understood that the formulae set forth in the foregoing specification and in the following claims represent the hydrous as well as the anhydrous forms of the compounds. It is also to be understood that the term "paramagnetic" as used in the following claims is employed in the broad sense to describe substrata which tend to concentrate lines of magnetic flux to a measurable degree and which would fall in the class of paramagnetic substances as classified in the Smithsonian Physical Tables, Fowle 1927, seventh edition.

What is claimed is:

1. A method of making a fluorescent paramagnetic compound comprising the step of precipitating a fluorescent inner metallic complex of a phenol of the group consisting of 8-hydroxyquinoline and derivatives thereof upon a solid powdered paramagnetic substrata.

2. A method of making a paramagnetic fluorescent pigment compound comprising the steps of dissolving a phenol of the group consisting of 8-hydroxyquinoline and derivatives thereof having a substituent for hydrogen and a zinc salt in alcohol to form a concentrated alcoholic solution, suspending a powdered paramagnetic substratum in said solution, and treating said solution with an alkaline agent to precipitate the inner zinc complex of said phenol on said paramagnetic substratum.

3. A method of making a paramagnetic fluorescent compound comprising the steps of dissolving 8-hydroxyquinoline and zinc nitrate in alcohol to form a concentrated alcoholic solution, dispersing powdered red magnetic iron oxide in said solution and treating said solution with an alkaline agent to precipitate the inner zinc complex of 8-hydroxyquinoline on said red magnetic iron oxide.

4. The method of making a fluorescent paramagnetic compound comprising the steps of precipitating a fluorescent component of the group consisting of the zinc, calcium, cadmium, beryllium, aluminum and magnesium inner complex salts of phenols of the group consisting of 8-hydroxyquinoline and derivatives thereof upon a solid powdered paramagnetic substrata.

5. The method according to claim 4 in which the substrata is a paramagnetic metallic substrata.

6. The method according to claim 4 in which the substrata is powdered magnetic iron oxide.

7. The method according to claim 4 in which the substrata is powdered magnetic red iron oxide.

8. The method according to claim 4 in which the substrata is a paramagnetic metal.

9. The method according to claim 8 in which the substrata is powdered iron.

10. The method according to claim 8 in which the substrata is powdered stainless steel.

11. The method according to claim 8 in which the substrata is powdered aluminum.

12. A powdered fluorescent paramagnetic compound comprising a fluorescent inner metallic complex of a phenol of the group consisting of 8-hydroxyquinoline and derivatives thereof at least partially enveloping a solid powdered paramagnetic substrata as precipitate formations condensed directly on and about separate particles of said powdered substrata.

13. A powdered fluorescent paramagnetic compound comprising a fluorescent inner metallic complex of a phenol of the group consisting of 8-hydroxyquinoline and derivatives thereof and a powdered paramagnetic substrata, said inner metallic complex being held in said substrata by molecular attraction between the complex and substrata.

14. A powdered fluorescent paramagnetic compound having a fluorescent inner metallic complex of the group consisting of a metal selected from the group of zinc, calcium, cadmium, beryllium, magnesium and aluminum and a phenol selected from the group consisting of 8-hydroxyquinoline and derivatives thereof said inner metallic complex at least partially enveloping a solid powdered paramagnetic substrata as precipitate formations condensed directly on and about separate particles of said powdered substrata.

15. A powdered fluorescent paramagnetic compound having a fluorescent inner metallic complex of the group consisting of a metal selected from the group of zinc, calcium, cadmium, beryllium, magnesium and aluminum and a phenol selected from the group consisting of 8-hydroxyquinoline and derivatives thereof said inner metallic complex at least partially enveloping a solid powdered paramagnetic substrata as precipitate formations condensed directly on and about separate particles of said powdered substrata of the group consisting of metals, metal alloys, metal oxides, metal hydroxides and metal salts.

16. A powdered fluorescent paramagnetic compound according to claim 15 in which the substrata is powdered magnetic iron oxide.

17. A powdered fluorescent paramagnetic compound according to claim 15 in which the substrata is powdered red magnetic iron oxide.

18. A powdered fluorescent paramagnetic compound according to claim 15 in which the substrata is powdered stainless steel.

19. A powdered fluorescent paramagnetic compound according to claim 15 in which the substrata is powdered aluminum.

20. A powdered fluorescent paramagnetic compound according to claim 15 in which the substrata is powdered iron.

21. A powdered fluorescent paramagnetic compound according to claim 15 in which the metal is zinc and the substrate is powdered red magnetic iron oxide.

22. A powdered fluorescent paramagnetic compound having a fluorescent inner metallic complex consisting of zinc 8-hydroxyquinoline at least partially enveloping a solid powdered paramagnetic substrata as precipitate formations condensed directly on and about separate particles of said powdered substrata consisting of powdered red magnetic iron oxide.

References Cited in the file of this patent

UNITED STATES PATENTS

| | | |
|---|---|---|
| 2,143,077 | Leverenz | Jan. 10, 1939 |
| 2,149,992 | Fonda | Mar. 7, 1939 |
| 2,171,970 | Brett et al. | Sept. 5, 1939 |
| 2,255,696 | Clifford | Sept. 9, 1941 |
| 2,267,999 | Switzer | Dec. 30, 1941 |

FOREIGN PATENTS

| | | |
|---|---|---|
| 417,488 | Great Britain | Oct. 5, 1934 |
| 292,819 | Germany | June 2, 1916 |

OTHER REFERENCES

Lake Pigments from Artificial Colours, by Jennison, 2nd rev. ed., pp 55, 56 (1920).

Berg: J. Prakt. Chem., vol. 115, pp. 178–185 (1927).

Smithsonian Physical Tables, by Fowle, 7th ed., p. 377 (1927).

UNITED STATES PATENT OFFICE
CERTIFICATE OF CORRECTION

Patent No. 2,864,771 December 16, 1958

Joseph L. Switzer et al.

It is hereby certified that error appears in the printed specification of the above numbered patent requiring correction and that the said Letters Patent should read as corrected below.

Column 1, lines 22 and 23, strike out "now U. S. Patent No. 2,831,816,".

Signed and sealed this 12th day of July 1960.

(SEAL)
Attest:

KARL H. AXLINE
Attesting Officer

ROBERT C. WATSON
Commissioner of Patents